(12) United States Patent
Hirschman et al.

(10) Patent No.: US 7,461,145 B2
(45) Date of Patent: Dec. 2, 2008

(54) GENERATING METRICS FOR NETWORKED DEVICES

(75) Inventors: Norman Ari Hirschman, Chevy Chase, MD (US); Eric M. Wall, Reston, VA (US); John W. Pierce, Washington, DC (US)

(73) Assignee: AOL LLC, Dulles, VA (US)

( * ) Notice: Subject to any disclaimer, the term of this patent is extended or adjusted under 35 U.S.C. 154(b) by 0 days.

(21) Appl. No.: 11/604,393

(22) Filed: Nov. 27, 2006

(65) Prior Publication Data

US 2007/0100997 A1    May 3, 2007

Related U.S. Application Data

(63) Continuation of application No. 10/184,071, filed on Jun. 28, 2002, now Pat. No. 7,143,158.

(60) Provisional application No. 60/356,124, filed on Feb. 14, 2002.

(51) Int. Cl.
*G06F 15/13* (2006.01)

(52) U.S. Cl. .......... 709/223; 709/203; 709/204; 709/225; 709/226; 370/401; 370/402

(58) Field of Classification Search .......... 703/203, 703/204, 223, 225, 226; 370/401, 402
See application file for complete search history.

(56) References Cited

U.S. PATENT DOCUMENTS

| | | | |
|---|---|---|---|
| 6,198,480 B1 | 3/2001 | Cotugno et al. | |
| 6,370,572 B1 * | 4/2002 | Lindskog et al. | 709/223 |
| 6,430,612 B1 * | 8/2002 | Iizuka | 709/223 |
| 6,714,551 B1 * | 3/2004 | Le-Ngoc | 370/401 |
| 6,801,940 B1 | 10/2004 | Moran et al. | |
| 2002/0174221 A1 | 11/2002 | Maxwell et al. | |

\* cited by examiner

*Primary Examiner*—Jinsong Hu
(74) *Attorney, Agent, or Firm*—Fish & Richardson P.C.

(57) ABSTRACT

Groups of network devices may be identified automatically based on interface tags associated with network device interfaces such that network devices within a group are automatically identified, periodically or otherwise, based on an association of one or more common interface tags between the group and the network device interface.

21 Claims, 14 Drawing Sheets

ART Interface Tag Editor

Tag FAQ

| Tag Name | Tag Description | |
|---|---|---|
|  |  | update |
| ae | AOL Edge (Reserved) | delete |
| ... | ... |  |
| pcs | PEER – Compuserve | delete |
| pct | PEER – China Telecom | delete |
| pcw | PEER – Cable and Wireless | delete |
| pcwdial | PEER – Cable & Wireless Dial | delete |
| pdcw | PEER DIAL – Cable & Wireless | delete |

FIG. 2B

ART Interface Group Editor (Tags Only)

Group FAQ

| Group Name | Group Definition | | | | |
|---|---|---|---|---|---|
| | | update | | delete | delete |
| | | | | | |
| AIM | | | delete | | |
| ... | | ... | | | |
| peering_CW | pcw | | | | |
| peering_Cais | pcais | | | | |

FIG. 3B

Group: Peering_CW

| Device Interface | Data First Associated With Interface | Data Last Associated With Interface |
|---|---|---|
| pop1-ash.atdn.net, POS13/0 | | |
| pop1-atm.atdn.net, POS2/1 | 2/5/2002 | |
| pop1-ntc.atdn.net, POS0/0 | | |
| pop1-ntc.atdn.net, POS5/0 | | 2/7/2002 |
| pop1-sun.atdn.net, POS0/3 | 2/6/2002 | |
| pop2-dal.atdn.net, POS2/0 | | 2/8/2002 |
| pop2-dal.atdn.net, POS2/1 | | |
| pop2-nye.atdn.net, POS3/0 | | 2/7/2002 |
| pop3-vie.atdn.net, POS0/0 | | |
| pop4-vie.atdn.net, POS7/0 | | |

FIG. 3D

```
986928634  +  pop1-loh.atdn.net  POS0/0
986932684  -  pop1-lon.atdn.net  POS2/0/0
987627815  +  pop2-loh.atdn.net  POS0/0
987709779  +  pop2-loh.atdn.net  POS0/0
988649726  -  pop2-loh.atdn.net  POS0/0
988749571  -  pop2-lon.atdn.net  POS2/0/0
992921302  +  pop2-vie.atdn.net  POS2/0
993051236  +  pop1-loh.atdn.net  POS7/0
993051236  -  pop1-loh.atdn.net  POS0/0
993087764  -  pop2-loh.atdn.net  POS0/0
993094695  +  pop2-loh.atdn.net  POS7/0
995319291  +  pop1-dcl.atdn.net  POS4/1
995403262  +  pop1-ntc.atdn.net  POS0/0
998077398  -  pop2-ntc.atdn.net  POS2/1
998697714  -  pop2-dcl.atdn.net  POS0/1
999807714  -  pop1-rtc.atdn.net  POS6/2
1000325125 -  pop2-nyc.atdn.net  POS0/1
1002247620 -  pop1-dcl.atdn.net  POS4/1
1002259531 +  pop1-dcl.atdn.net  POS4/1
1002528721 -  pop1-dcl.atdn.net  POS4/1
1002540517 +  pop1-dcl.atdn.net  POS4/1
1003547000 +  pop1-atm.atdn.net  POS2/1
1003958490 +  pop1-ash.atdn.net  POS0/2
1003958490 -  pop1-loh.atdn.net  POS7/0
1003958490 -  pop2-loh.atdn.net  POS7/0
1004131127 +  pop2-nye.atdn.net  POS3/0
1004421135 -  pop1-dcl.atdn.net  POS4/1
1004443330 +  pop1-dcl.atdn.net  POS4/1
1007072982 +  pop3-vie.atdn.net  POS0/0
1007485444 +  pop4-vie.atdn.net  POS0/0
1007570868 -  pop4-vie.atdn.net  POS0/0
1007585535 +  pop2-dal.atdn.net  POS2/0
1007654567 -  pop1-dcl.atdn.net  POS4/1
1007664523 +  pop2-dal.atdn.net  POS2/1
1007669346 +  pop4-vie.atdn.net  POS7/0
1008242088 -  pop1-ash.atdn.net  POS0/2
1008955372 -  pop2-vie.atdn.net  POS2/0
1011039494 +  pop1-ash.atdn.net  POS13/0
1011782687 -  pop2-nye.atdn.net  POS3/0
1011803375 +  pop2-nye.atdn.net  POS3/0
1011947656 -  pop4-vie.atdn.net  POS7/0
1011958716 +  pop4-vie.atdn.net  POS7/0
1012960738 -  pop2-dal.atdn.net  POS2/1
1013014798 +  pop1-ntc.atdn.net  POS5/0
1013014798 -  pop1-ntc.atdn.net  POS0/0
1013020388 -  pop1-ntc.atdn.net  POS5/0
1013102334 +  pop1-ntc.atdn.net  POS5/0
1013203592 +  pop1-sun.atdn.net  POS0/3
```

FIG. 3E

Cable & Wireless Report for 01/29/2002 - 02/11/2002 (GMT)

Values listed are the 90 percentile of the daily utilization.
Click here for overall report.

| Peer Name | Dir | Speed | Tue 29 | Wed 30 | Thu 31 | Fri 01 | Sat 02 | Sun 03 | Mon 04 | Tue 05 | Wed 06 | Thu 07 | Fri 08 | Sat 09 | Sun 10 | Mon 11 |
|---|---|---|---|---|---|---|---|---|---|---|---|---|---|---|---|---|
| CW | | | | | | | | | | | | | | | | |
| pop1-ash.atdn.net, POS13/0 [v] | in | 12440 | 15.7 | 14.1 | 15.3 | 13.0 | 11.6 | 11.2 | 10.0 | 10.8 | 10.1 | 10.4 | 10.2 | 8.9 | 9.7 | 10.2 |
| pop1-ash.atdn.net, POS13/0 | out | 12440 | 16.6 | 16.3 | 16.3 | 18.5 | 18.4 | 19.0 | 18.4 | 28.8 | 30.5 | 29.0 | 26.8 | 17.1 | 18.1 | 19.5 |
| pop1-atm.atdn.net, POS2/1 [v] | in | 2488 | - | - | - | - | - | - | - | 2.5 | 3.1 | 4.5 | 5.4 | 3.2 | 3.1 | 3.4 |
| pop1-atm.atdn.net, POS2/1 | out | 2488 | 33.9 | 33.5 | 33.9 | 30.9 | 26.5 | 21.9 | 19.7 | 54.6 | 63.7 | 67.2 | 61.4 | 36.8 | 38.5 | 50.3 |
| pop1-ntc.atdn.net, POS0/0 [v] | in | 622 | 76.1 | 76.8 | 77.1 | 82.7 | 80.2 | 82.9 | 84.2 | 22.2 | 25.6 | 27.2 | 23.5 | 26.0 | 26.7 | 29.9 |
| pop1-ntc.atdn.net, POS0/0 | out | 622 | 12.3 | 12.4 | 12.0 | 10.9 | 9.1 | 9.3 | 9.2 | 85.6 | 85.0 | 84.9 | 82.9 | 83.2 | 86.3 | 82.6 |
| pop1-ntc.atdn.net, POS5/0 [v] | in | 622 | 22.8 | 23.7 | 22.6 | 22.7 | 18.6 | 18.5 | 24.4 | 10.0 | 9.6 | - | - | - | - | - |
| pop1-ntc.atdn.net, POS5/0 | out | 622 | - | - | - | - | - | - | - | 21.9 | 17.6 | - | - | - | - | - |
| pop1-sun.atdn.net, POS0/3 [v] | in | 2488 | - | - | - | - | - | - | - | - | 0.3 | 6.0 | 8.9 | 8.5 | 9.0 | 34.1 |
| pop1-sun.atdn.net, POS0/3 | out | 2488 | - | - | - | - | - | - | - | - | 0.5 | 7.9 | 14.4 | 13.8 | 14.6 | 19.2 |
| pop2-dal.atdn.net, POS2/0 [v] | in | 622 | 33.2 | 33.8 | 31.3 | 31.9 | 30.7 | 27.3 | 23.8 | 25.3 | 27.4 | 30.2 | 27.4 | 30.0 | 30.2 | 32.9 |
| pop2-dal.atdn.net, POS2/0 | out | 622 | 47.7 | 45.8 | 42.3 | 46.9 | 51.8 | 52.3 | 48.6 | 55.3 | 54.4 | 50.8 | 48.9 | 48.3 | 51.0 | 49.3 |
| pop2-dal.atdn.net, POS2/1 [v] | in | 622 | 0.0 | 0.0 | 0.0 | 0.0 | 0.0 | 0.0 | 0.0 | 0.0 | 0.0 | 0.0 | 0.0 | 0.0 | 0.0 | 0.0 |
| pop2-dal.atdn.net, POS2/1 | out | 622 | 0.0 | 0.0 | 0.0 | 0.0 | 0.0 | 0.0 | 0.0 | 0.0 | 0.0 | - | - | - | - | - |
| pop2-nye.atdn.net, POS3/0 [v] | in | 2488 | 11.0 | 11.7 | 11.3 | 9.7 | 9.1 | 9.5 | 7.9 | 8.2 | 8.4 | 8.5 | 9.6 | 10.6 | 11.0 | 9.5 |
| pop2-nye.atdn.net, POS3/0 | out | 2488 | 17.1 | 17.0 | 17.4 | 18.0 | 18.8 | 19.4 | 17.7 | 18.0 | 16.9 | 14.4 | 10.8 | 12.2 | 12.5 | 11.8 |
| pop3-vie.atdn.net, POS0/0 [v] | in | 2488 | 20.0 | 16.3 | 19.1 | 14.2 | 12.3 | 13.1 | 12.7 | 14.0 | 15.3 | 12.3 | 14.7 | 15.4 | 17.3 | 18.5 |
| pop3-vie.atdn.net, POS0/0 | out | 2488 | 1.3 | 0.7 | 0.9 | 4.9 | 3.8 | 3.8 | 3.6 | 59.8 | 2.9 | 2.9 | 2.7 | 0.9 | 0.8 | 2.8 |
| pop4-vie.atdn.net, POS7/0 [v] | in | 622 | 5.6 | 4.6 | 4.9 | 4.4 | 5.3 | 5.4 | 4.0 | 4.0 | 4.5 | 7.5 | 4.7 | 6.2 | 7.0 | 7.4 |
| pop4-vie.atdn.net, POS7/0 | out | 622 | 0.0 | 0.0 | 0.0 | 0.0 | 0.0 | 0.0 | 0.0 | 0.0 | 0.0 | 0.0 | 0.0 | 0.0 | 0.0 | 0.0 |

FIG. 4A

| Billing Data |
| --- |
| Date x - Date y |
| ( ) |

Group 2
Billing Report (                    )
Billed Traffic Rate*:              MBits Per Second Outbound
Total Amount Due:              (Based on Outbound Traffic)
* Highest of the Average Daily Nth Percentile of the In or Out Traffic.
In:
Ninety Fifth Percentile:          Megabits Per Second
Price Per Megabit Second:
Total Due for Period:             (Based on Inbound)
Number of Data Points:
Minimum:                           Megabits Per Second
Maximum:                          Megabits Per Second
Median:                             Megabits Per Second
Average:                            Megabits Per Second
Out:
Ninety Fifth Percentile:          Megabits Per Second
Price Per Megabit Second:
Total Due for Period:             (Based on Outbound)
Number of Data Points:
Minimum:                           Megabits Per Second
Maximum:                          Megabits Per Second
Median:                             Megabits Per Second
Average:                            Megabits Per Second Total Speed:
Interfaces:

| | Pts | Minimum | Maximum | Average | Median | 95th %ile |
| --- | --- | --- | --- | --- | --- | --- |
| Pop1-ash.atdn.net - P0S13/0 (0) : | | | | | | |
| In: | 0 | 0 | 0 | 0 | 0 | 0 |
| Out: | 0 | 0 | 0 | 0 | 0 | 0 |
| Pop1-atm.atdn.net - P0S2/1 (622000000) : | | | | | | |
| In: | 8907 | 35668424 | 240787024 | 117995600 | 117704552 | 198072720 |
| Out: | 8907 | 84804800 | 511663360 | 355975519 | 359204768 | 460832224 |
| Pop1-ntc.atdn.net - P0S0/0 (622000000) : | | | | | | |
| In: | 8915 | 13564929 | 87182000 | 43428348 | 43028000 | 70201168 |
| Out: | 8915 | 28137718 | 237849008 | 97164118 | 94575000 | 155773776 |
| Pop2-dal.atdn.net - P0S2/0 (622000000) : | | | | | | |
| In: | 8911 | 10841107 | 241686848 | 125478265 | 123553000 | 196121536 |
| Out: | 8911 | 8457979 | 346528992 | 245625076 | 247750992 | 304515904 |
| Pop2-dal.atdn.net - P0S2/1 (622000000) : | | | | | | |
| In: | 8911 | 0 | 0 | 0 | 0 | 0 |
| Out: | 8911 | 0 | 0 | 0 | 0 | 0 |
| Pop2-nye.atdn.net - P0S3/0 (2488000000) : | | | | | | |
| In: | 6390 | 28936196 | 314603904 | 176396943 | 175397504 | 269427008 |
| Out: | 6390 | 92051200 | 419044000 | 272805332 | 268207760 | 367616992 |

FIG. 5A

```
Pop3-vie.atdn.net - POS0/0  (2488000000) :
   In:  8909            0 1609314944  242488811  254144992  391658528
   Out: 8909            0 1185345152   49018083   34253624  139246912
Pop4-vie.atdn.net - POS7/0  (2488000000) :
   In:  1936      4291857  223538704   31145182   25632058   38729548
   Out: 1936            0   39585544     801267          0       2336
```

| Day | In %ile | Out %ile | Speed |
| --- | --- | --- | --- |
| 1 | 1123.9 | 1149.0 | 8086.0 |
| 2 | 1153.9 | 1340.7 | 8086.0 |
| 3 | 1121.7 | 1340.2 | 8086.0 |
| 4 | 1029.3 | 1333.5 | 8086.0 |
| 5 | 1040.5 | 1229.5 | 8086.0 |
| 6 | 1126.4 | 1265.9 | 8086.0 |
| 7 | 1140.0 | 1361.7 | 8086.0 |
| 8 | 1079.2 | 1293.9 | 8086.0 |
| 9 | 987.1 | 1159.7 | 8086.0 |
| 10 | 922.8 | 1148.1 | 8086.0 |
| 11 | 861.1 | 1137.4 | 8086.0 |
| 12 | 882.4 | 1115.7 | 8086.0 |
| 13 | 973.2 | 1170.6 | 8086.0 |
| 14 | 973.2 | 1233.6 | 8086.0 |
| 15 | 931.2 | 1305.2 | 8086.0 |
| 16 | 906.5 | 1351.5 | 8086.0 |
| 17 | 887.7 | 1250.9 | 8086.0 |
| 18 | 929.4 | 1326.8 | 8086.0 |
| 19 | 818.9 | 1225.3 | 8086.0 |
| 20 | 819.9 | 1229.1 | 8086.0 |
| 21 | 876.1 | 1336.8 | 8086.0 |
| 22 | 949.2 | 1272.4 | 8086.0 |
| 23 | 826.9 | 1071.2 | 8086.0 |
| 24 | 994.1 | 1206.6 | 8086.0 |
| 25 | 1073.0 | 1333.2 | 9952.0 |
| 26 | 1050.9 | 1314.1 | 8086.0 |
| 27 | 1161.8 | 1390.1 | 8086.0 |
| 28 | 1292.6 | 1380.3 | 8086.0 |
| 29 | 964.6 | 1337.5 | 8086.0 |
| 30 | 1255.6 | 1339.5 | 8086.0 |
| 31 | 1063.3 | 1391.9 | 8086.0 |

FIG. 5B

GENERATING METRICS FOR NETWORKED DEVICES

CROSS-REFERENCE TO RELATED APPLICATIONS

This application claims priority from U.S. Provisional Application No. 60/356,124, filed Feb. 14, 2002, and titled GENERATING METRICS FOR NETWORKED DEVICES, and from U.S. Utility application Ser. No. 10/184,071, filed Jun. 28, 2002, now U.S. Pat. No. 7,143,158 and titled GENERATING METRICS FOR NETWORKED DEVICES, which are hereby incorporated by reference in their entirety for all purposes.

TECHNICAL FIELD

This invention relates to automating the aggregating of metrics for multiple network devices.

BACKGROUND OF THE INVENTION

LAN administrators and network engineers sometimes need to obtain metrics for devices in their network, particularly with respect to network traffic input and output by one or more network devices. If obtainable, these performance metrics serve several purposes. For example, they may be useful in evaluating internal network performance and distribution of network traffic, enabling reconfiguration and optimization of network resources. They also may be useful in monitoring traffic communicated between the network devices and external devices or services, enabling evaluation of (1) internal network resource utilization and (2) external resource and service utilization by network devices.

In various applications, such as those described above, it often is desirable to obtain performance metrics for a collection or group of network devices, which may or may not be physically proximate or otherwise grouped. For instance, to determine external device/service utilization by internal network devices, it may be necessary to obtain aggregate metrics for the logical grouping of network devices interfacing with and utilizing an external device/service. Similarly, to determine network resource utilization by an external device/service, it may be necessary to obtain aggregate metrics for network devices used to make available the network resource.

Independent lists may be manually established and maintained to enable grouping of devices or interfaces from which data is sought. However, because these lists are manually maintained, they often become incomplete or outdated.

SUMMARY

Groups of network devices may instead be identified automatically based on electronic interface tags associated with network device interfaces such that network devices within a group are automatically identified, periodically or otherwise, based on an association of one or more common interface tags between the group and the network device interface.

The details of one or more implementations are set forth in the accompanying drawings and the description below. Other features will be apparent from the description and drawings, and from the claims.

DESCRIPTION OF DRAWINGS

FIG. 2B illustrates an example of an interface tag editor that can be used to create and edit interface tag definitions.

FIG. 3B illustrates a group editor that may be used to create and maintain a group definitions table that relates group names to their defining tags.

FIGS. 3D and 3E illustrate history files that are useful for tracking temporal changes in the association of interfaces to groups.

FIG. 4A is a report showing metrics for network devices that belong to the group "peering-CW."

FIGS. 5A-5C illustrate billing and other financial and statistical reports.

Like reference symbols in the various drawings indicate like elements.

DETAILED DESCRIPTION

Aggregation of metrics for network resources requires organization of network devices/resources. For example, to aggregate network traffic metrics for all network devices utilizing an external resource, it may be necessary to (1) identify the network devices utilizing the external resource, and (2) measure traffic metrics at those devices attributable to usage of the external resource. More specific examples follow. If an online service provider (OSP) is charged by its peers (e.g., Sprint) based on the traffic routed from OSP to the peer, it is helpful to identify all OSP network devices routing traffic to the peer and to measure the traffic metrics at those identified OSP network devices that represent communications sent to the peer. Similarly, a group of network devices may be identified based on tags associated with interfaces therefore, and the "health" or error status of those devices can be collectively monitored. Where the group represents devices enabling all communications with another entity, the tags can be used to gather and monitor statistics for communication with the entity.

Figure 1:
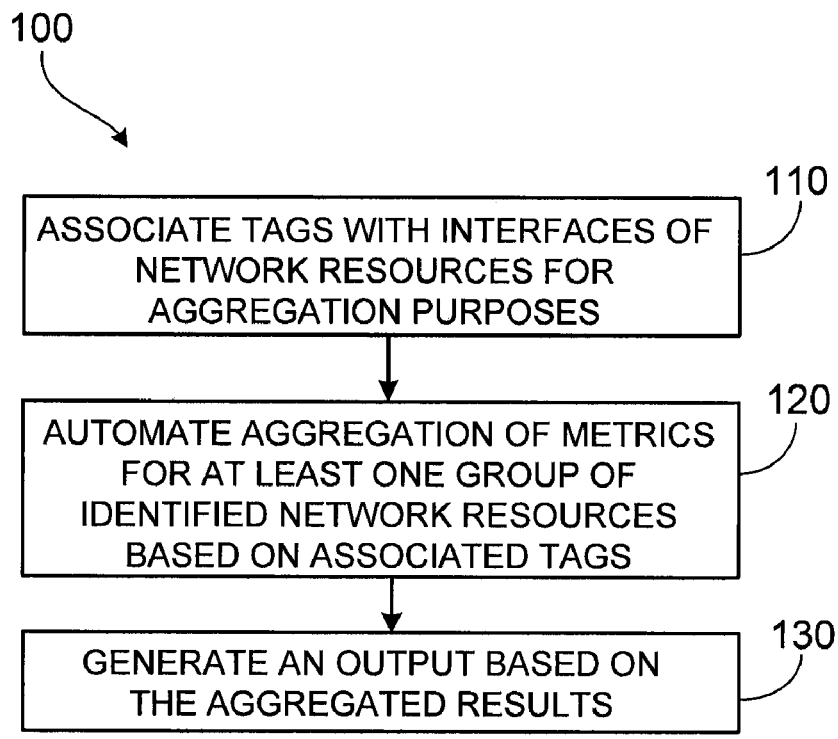
FIG. 1 is a flow chart of a process for automatically aggregating metrics for more than one network device.

Referring to FIG. 1, the process for automatically aggregating metrics for more than one network device may include identifying network resources for aggregation purposes (110), automating the aggregation of metrics from the identified resources (120), and generating an output such as a report or strategic decision based on the aggregated results (130).

Figure 2A:
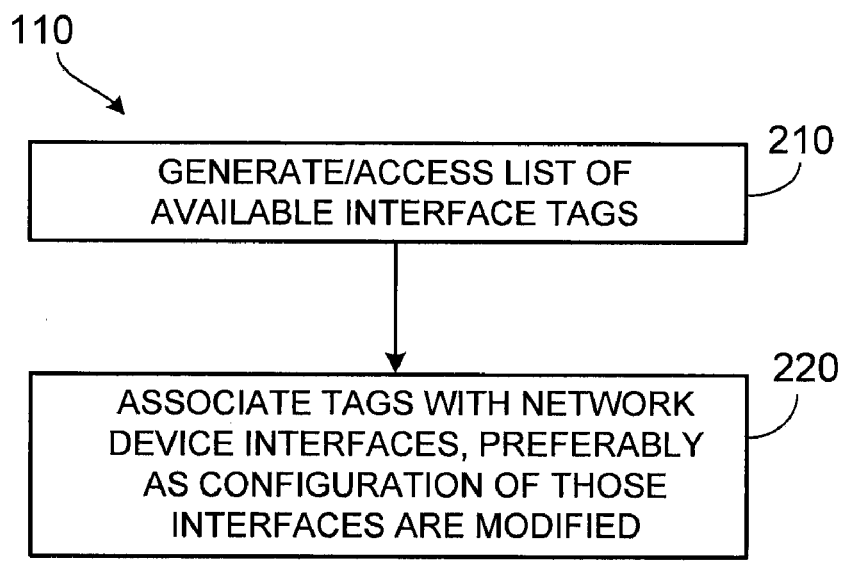
FIG. 2A is a flow chart of a process for identifying network resources available for aggregation.

Referring to FIG. 2A, network resources available for aggregation may be identified (110) by generating or accessing one or more interface tags for use (210) and by associating appropriate interface tags with network device interfaces (220).

FIG. 2B illustrates an example of a interface tag editor that can be used to create and edit interface tag definitions (210). Using such a table, a list of available interface tags and their related descriptions may be maintained as a resource to be referenced when seeking to associate consistent interface tags with network device interfaces.

Tags typically are associated with interfaces (220) for network devices that represent communication points with other network devices. For instance, rather than associating a tag with a router that uses several blades to support connectivity to various devices, or even associating a tag with an interface for a router blade that uses several ports to support connectivity to various devices, tags tend to be associated with the lowest-level of network connectivity, the ports in this example. Below are examples of different line cards available for Cisco routers, each having at least one port that contains a tagable interface:

http://www.cisco.com/univercd/cc/td/doc/pcat/qoc48_11.htm, http://www.cisco.com/univercd/cc/td/doc/pcat/oc12_12.htm, http://www.cisco.com/univercd/cc/td/doc/pcat/gget_13.htm, http://www.cisco.com/univercd/cc/td/doc/pcat/gget_11.htm, and http://www.cisco.com/univercd/cc/td/doc/pcat/oc3stm11.htm.

As will be better understood when groupings are discussed with respect to step 120, by associating tags with network device interfaces representing a low (e.g., perhaps the lowest level) of connectivity, tags associated with a particular network device may be modified using the interface accessed by technicians charged with configuring or reconfiguring that network device, increasing the likelihood that network configuration changes will be documented in a meaningful and timely manner.

A dedicated field may be provided in a network device interface for storage of tags. Alternatively, tags may be stored by network device interface fields designed for other purposes, and may supplant, replace or supplement data in those fields (e.g., notes or title). When supplementing other data, a tag identifier (e.g., "T") or protocol (e.g., "T=tag name") may be used to distinguish the tag from the other data in the field.

Below are examples of several instances of tags inserted into and supplementing data within the ifDescr interface description SNMP (Simple Network Management Protocol) variable field, which is a variable field under the SNMP that is contained within the network interface to allow users to input any type of field (e.g., a notes field). In these examples, the tag is distinguished from other data within the title field using a tag identifier ("T") and a tag identifying protocol ("(T=tag name)").

| Device Name & Interface | ifDescr field. The tag is the part marked as (T = . . . ) |
|---|---|
| pop1-sun.atdn.net, POS0/3, | pop1-sun-P0-3-CandW (204.172.156.68/30 CandW: 1538408) (T = pcW) |
| pop2-dal.atdn.net, POS2/0, | pop2-dal-p2-0-C&W (204.172.138.128/30 CW: 1495797) (T = pCW) |
| pop2-nye.atdn.net, POS3/0, | pop2-nye-P3-0-CandW (202.24.207.216/30 CW: 1497391) (T = pCW) |
| pop2-loh.atdn.net, POS7/0, | pop2-loh-P7-0-CandW (199.811.180/30 CW: p20484a) (T = pCWDIAL) |
| pop3-vie.atdn.net, POS0/0, | pop3-vie-P0-0-CandW (202.24.238.88/30 CW: 1509667) (T = pCW) |
| pop4-vie.atdn.net, POS7/0, | pop4-vie-P7-0-CW (204.173.155.123/30 SIGMA: jk1001, CW: 1475509)(T = pCW) |

As demonstrated by the above examples, tags are distinct from information ordinarily provided on the network device interface in that they typically are generic as to device attributes such as IP address and title. Generally, a single tag is associated with each network device interface since each interface typically communicates with an identifiable category of network device for purposes of tagging. However, to the extent that a network device communicates with more than one other category of network device (e.g., peer Sprint in the above example) for purposes of tagging, multiple tags may be associated with the interface for that network device, and traffic through that network device may or may not be apportioned among the different tags associated therewith. For instance, refined searching may be enabled by associating multiple tags to one or more particular interfaces.

Furthermore, an associated multiplier may be associated with each tag of an interface having multiple associated tags to reflect or appropriately apportion traffic attributable to each tag. Similarly, to the extent that data from one device interface is needed by several reports, the interface tag may be associated with each of those reports by referencing its groups, as will be understood more clearly with references to the description of step 120.

To preserve memory while enabling recognizable string names to be used for tags, tag names may be reformatted prior to storage. For instance, a tag name having a space may be reformatted to remove this space prior to storage. In this manner, when subsequent searches are performed for the tag name, the query tag should be modified to remove spaces.

Figure 3A:
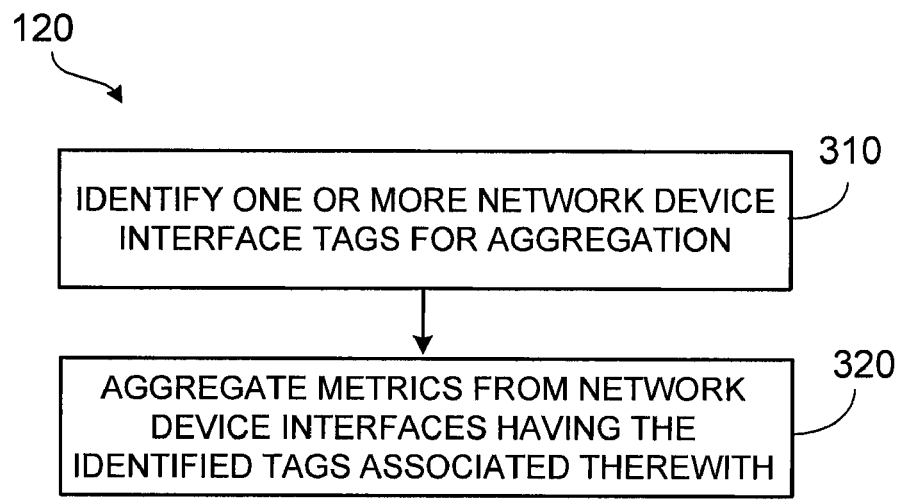
FIG. 3A is a flow chart of a process for automating the aggregation of metrics from identified network resources.

Referring to FIG. 3A, the aggregation and metrics from the identified network resources may be automated (120) by identifying one or more tags for aggregation (310) and aggregating the metrics from the network device interfaces having identical tags associated therewith (320).

Tags may be identified for aggregation (310) in response to user input. For instance, a user may be provided an interface through which selections of tags may be made manually. Alternatively, a selected list or all of the tags may be pre-identified for automatic processing. In any event, tags may be used to define groups of network device interfaces and thus network devices. Furthermore, one or more tags may themselves be grouped. For instance, FIG. 3B illustrates a group editor that may be used to create and maintain a group definitions table that relates group names to their defining tags. Various levels of access may be provided to such a table (e.g., viewing versus modifying).

Figure 3C:
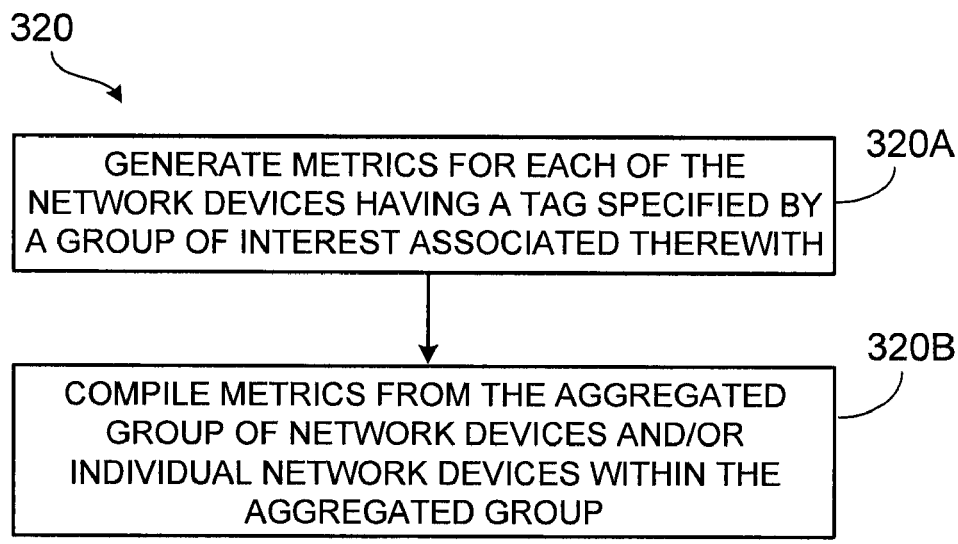
FIG. 3C is a flow chart of a process for automatically aggregating metrics from network device interfaces having identified tags associated therewith.

Referring to FIG. 3C, the metrics from network device interfaces having identified tags associated therewith may be automatically aggregated (320) by generating metrics for each of the network devices having a tag specified by a group of interest (320A) and compiling metrics for the group of network devices and/or individual network devices within the aggregated group (320B).

The aggregation of metrics for network devices typically accounts for the particular period of time that a network device includes the tag of interest. For instance, during the process of FIG. 3C, metrics are generated for each of the network devices during the period of time in which those devices had an identified tag associated therewith (320A). Thus, the metrics compiled for any particular group of aggregated network devices may reflect activities of those individual devices during only the time period for which the individual devices have interface tags defined by the group.

To enable accurate reporting of temporal associations between tags and interfaces, and hence between network devices and groups, timing information may be maintained regarding the tag/interface relationship. Specifically, in one implementation, a "history" file is maintained at a server to enable tracking of the addition/removal of tags to/from interfaces, or of interfaces to/from groups based on changes in the association of tags to interfaces, or the association of tags to interfaces, or the association of tags to groups. This history file may be populated through manual investigations, routine/periodic investigations (e.g., hourly, daily, etc.), or event-triggered investigations (e.g., based on the occurrence of change) of network device interface status. Hence, changes in interface tags that occur between reports may be detected, recorded and accounted for.

FIGS. 3D and 3E illustrate history files that are useful for tracking temporal changes in the association of interfaces to groups. In FIG. 3D, device interfaces within a group are listed with information reflecting the first and last temporal association with the group, and in FIG. 3E, the "+" and "−" symbols are used to represent the addition to or removal of an interface from a group at a recorded data (UNIX code, e.g., 986928634=041 02001-1850 GMT/04102001-1450 LOCAL). But other history files also may be useful, such as a history file showing temporal changes in the association of tags with interfaces, from which group changes could be extrapolated. In addition, periodic investigations may be avoided by storing historical information regarding tag changes at the interface itself, and merely uploading or otherwise accessing such information when aggregating metrics for network devices.

Thus, a report may be generated (130) to reflect metrics for each network device having an interface tag specified by a particular group of interest. FIG. 4A shows metrics for network devices that belong to the group "peering-CW", and includes summary information for this group in its first two lines. This report is generated with reference to recorded historical timing information, e.g., see FIG. 3D. As such, metrics for interfaces within the report are sometimes omitted, reflecting that this group's tag was not associated with the particular interface during certain periods covered by the report. For instance, the FIG. 4A report contains data corresponding to the FIG. 3D historical timing data in that the metrics for pop1-ash.atdn.net, POS13/0 are omitted from the report until that interface was tagged on Tuesday the $5^{th}$ (410), and the metrics for pop1-ntc.atdn.net, POS0/0 are omitted from the report after that interface was no longer associated with the group tag on Thursday the $7^{th}$ (420).

Figure 4B:
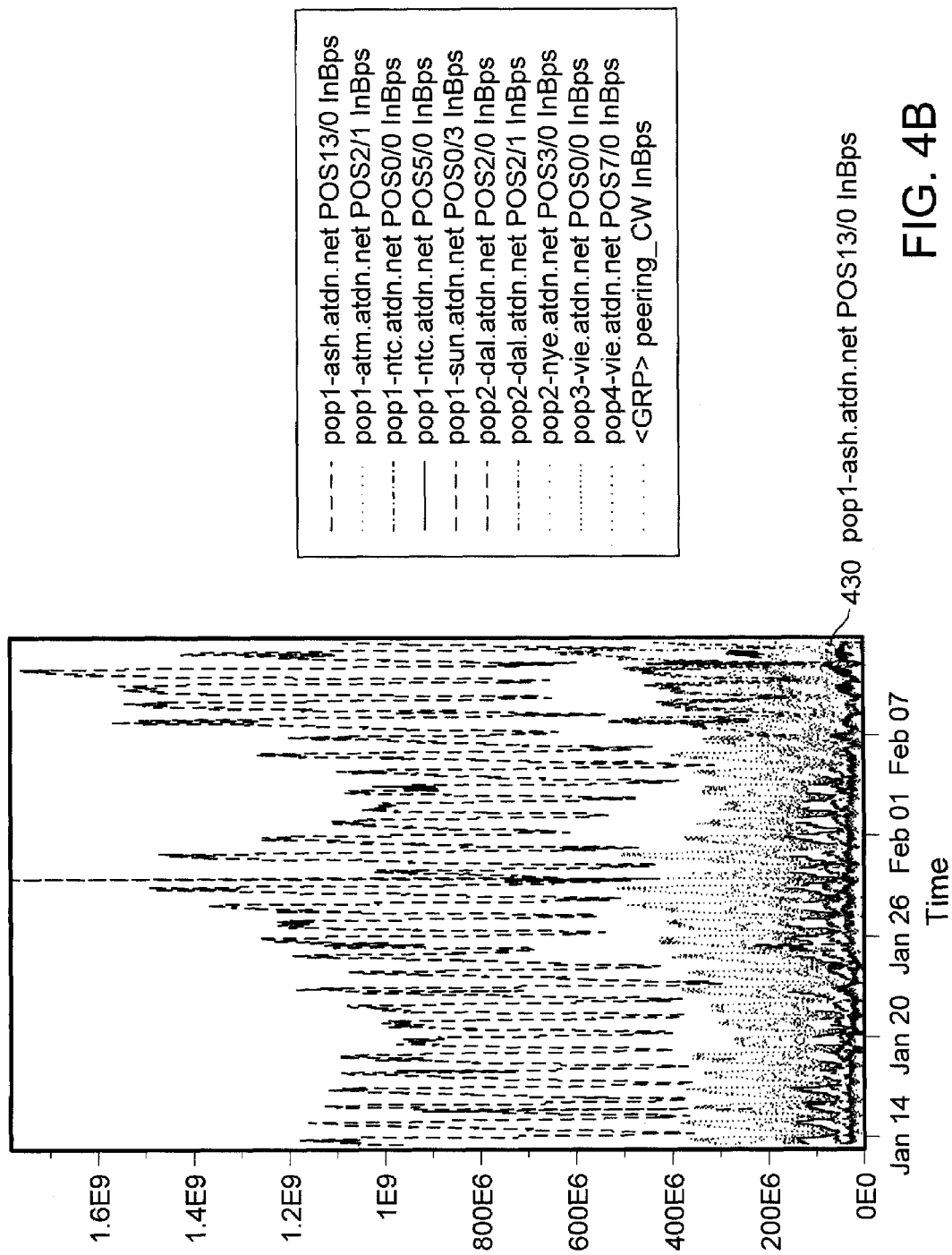
FIGS. 4B and 4C illustrate a graphical representation of the data shown by FIG. 4A.
Figure 4C:
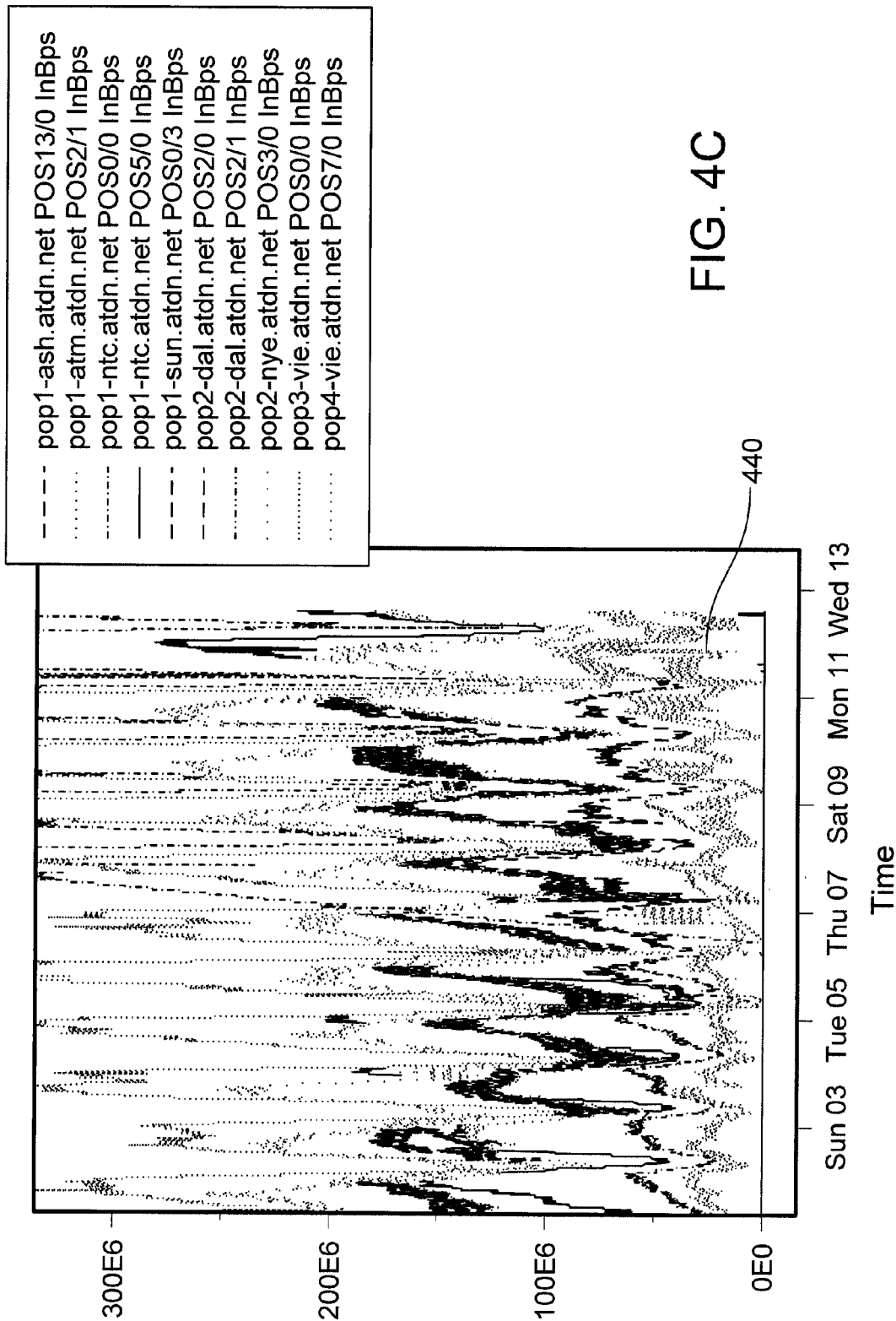

FIGS. 4B and 4C illustrate a graphical representation of the data shown by FIG. 4A and therefore also may be used to identify the present or absence of a network device within the group over a period of time. See reference numerals 430 and 440 corresponding to the addition of pop1-ash.atdn.net, POS13/0 InBps on Tuesday the $5^{th}$.

Figure 5C:
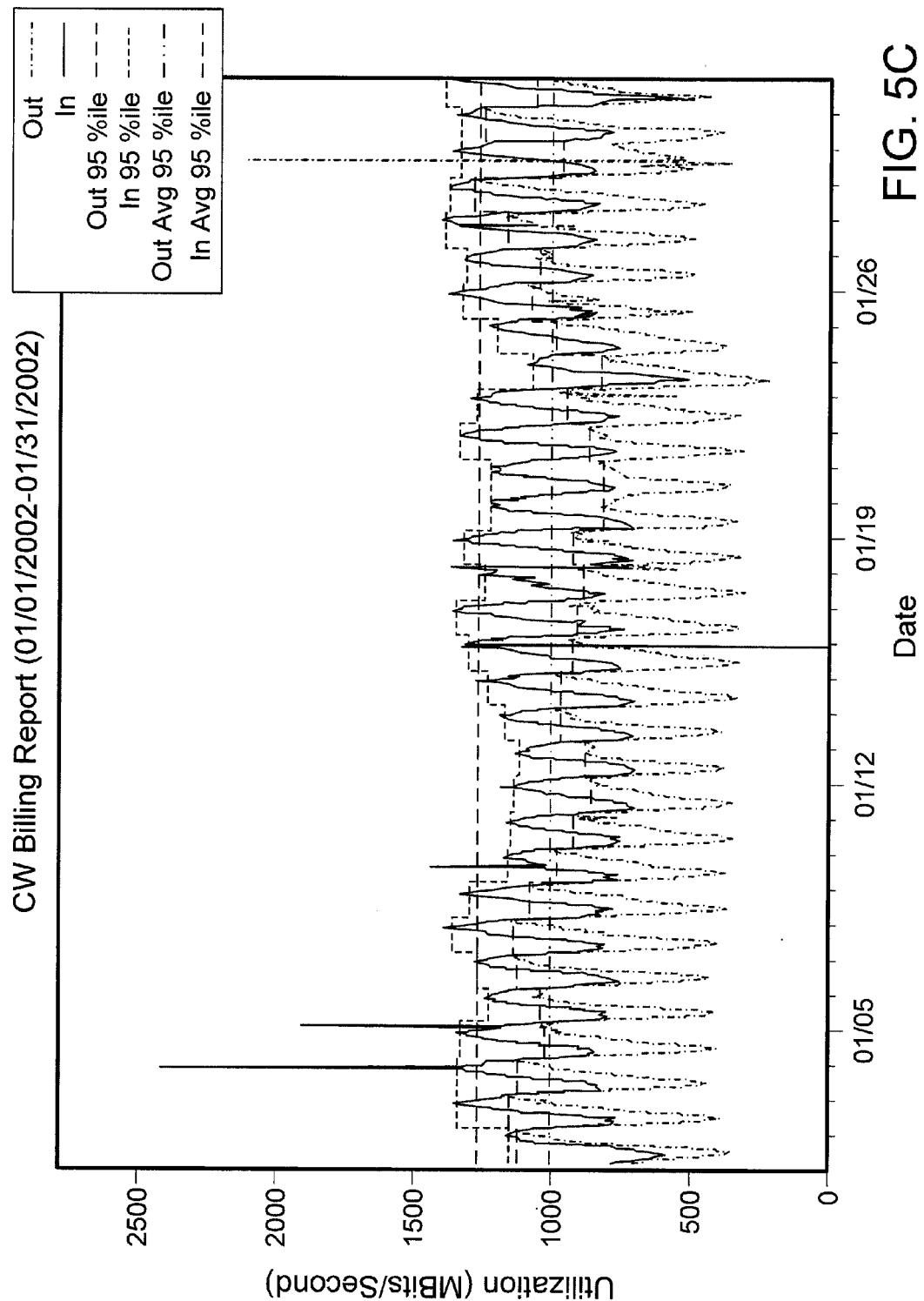

And, as illustrated by FIGS. 5A-5C, billing and other financial and statistical reports may be generated based on the metrics of groups, to enable strategic decision-making and record keeping.

Figure 6A:
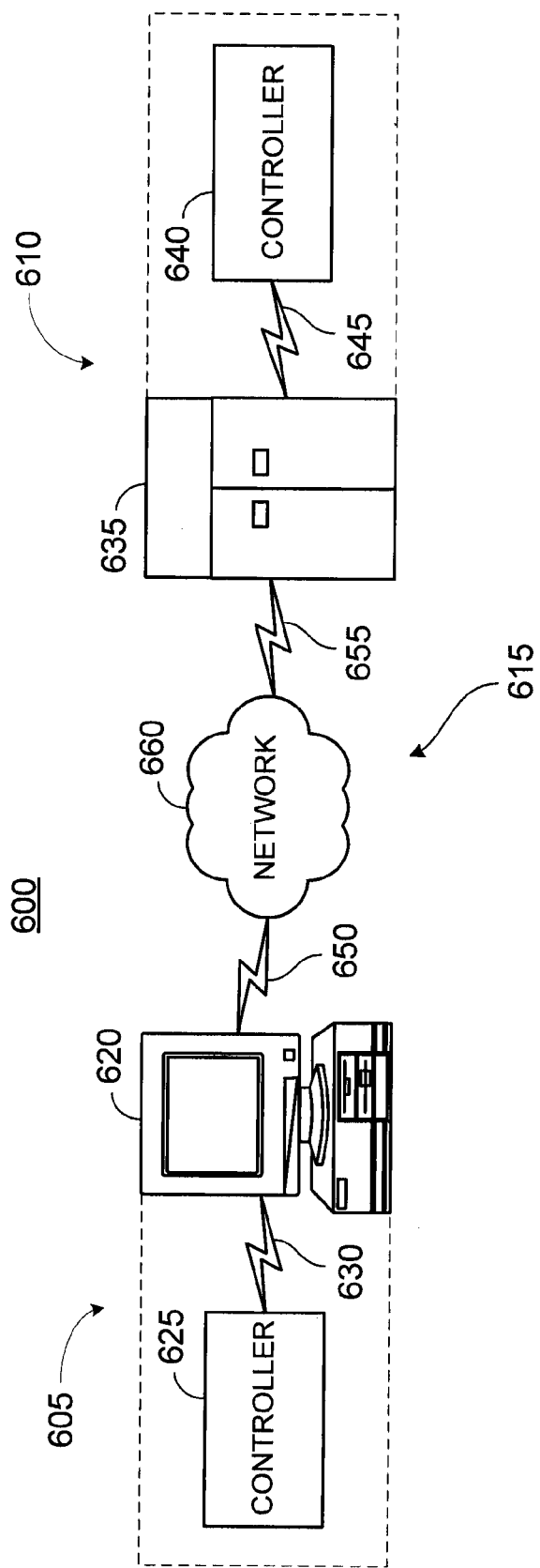
FIGS. 6A and 6B are block diagrams of a communications system for implementing techniques described with respect to FIGS. 1-5C.
Figure 6B:
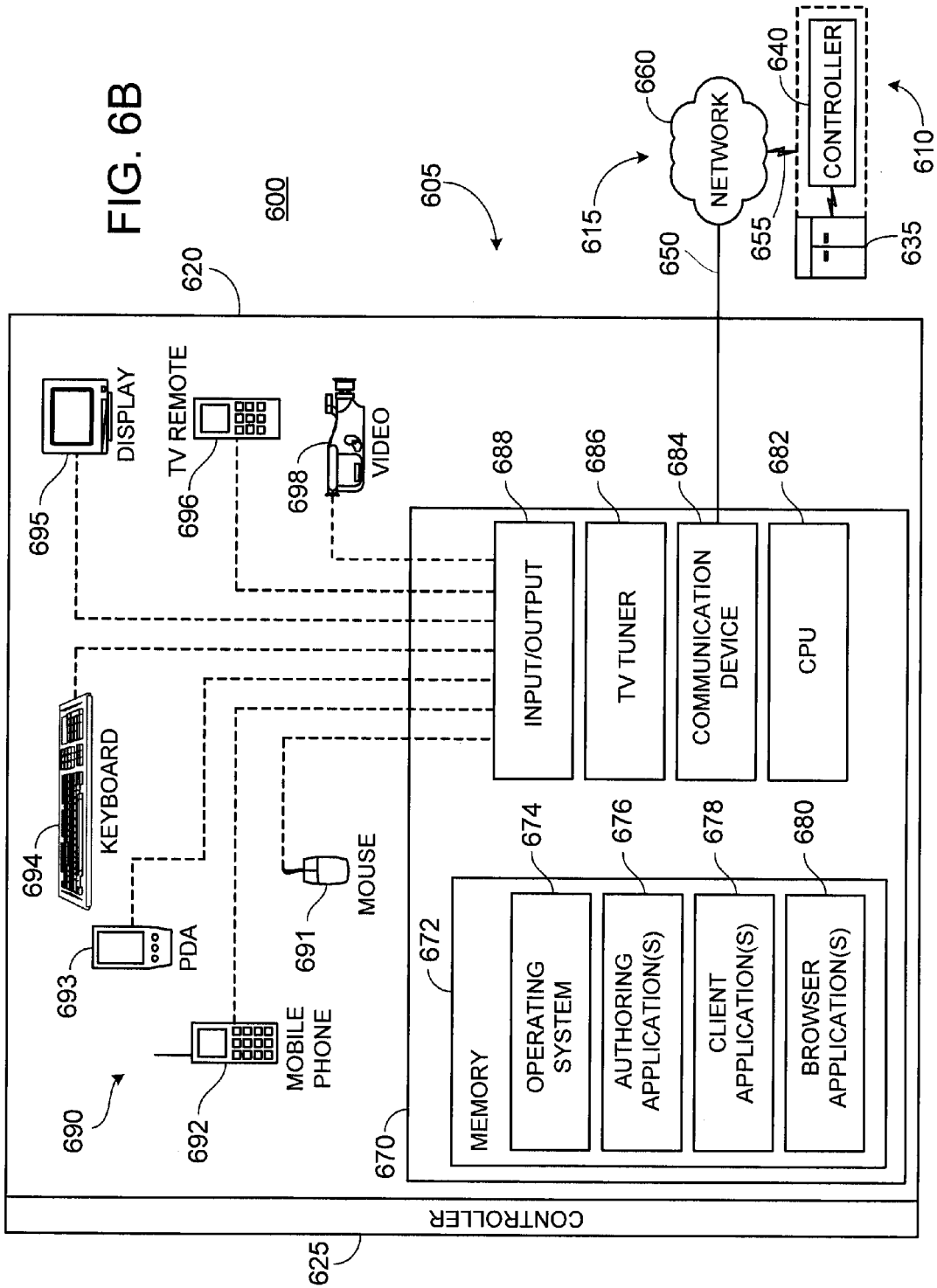

For illustrative purposes, FIGS. 6A and 6B describe a communications system for implementing techniques described with respect to FIGS. 1-5C. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 6A, a communications system 600 is capable of delivering and exchanging data between a client system 605 and a host system 610 through a communications link 615. The client system 605 typically includes one or more client devices 620 and/or client controllers 625, and the host system 610 typically includes one or more host devices 635 and/or host controllers 640. For example, the client system 605 or the host system 610 may include one or more general-purpose computers (e.g., personal computers), one or more special-purpose computers (e.g., devices specifically programmed to communicate with each other and/or the client system 605 or the host system 610), or a combination of one or more general-purpose computers and one or more special-purpose computers. The client system 605 and the host system 610 may be arranged to operate within or in concert with one or more other systems, such as, for example, one or more LANs ("Local Area Networks") and/or one or more WANs ("Wide Area Networks").

The client device 620 (or the host device 635) is generally capable of executing instructions under the command of a client controller 625 (or a host controller 640). The client device 620 (or the host device 635) is connected to the client controller 625 (or the host controller 640) by a wired or wireless data pathway 630 or 645 capable of delivering data.

The client device 620, the client controller 625, the host device 635, and the host controller 640 each typically include one or more hardware components and/or software components. An example of a client device 620 or a host device 635 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 625 or a host controller 640 is a software application loaded on the client device 620 or the host device 635 for commanding and directing communications enabled by the client device 620 or the host device 635. Other examples include a program, a piece of code, an instruction, a device, a computer, a computer system, or a combination thereof, for independently or collectively instructing the client device 620 or the host device 635 to interact and operate as described. The client controller 625 and the host controller 640 may be embodied permanently or temporarily in any type of machine, component, physical or virtual equipment, storage medium, or propagated signal capable of providing instructions to the client device 620 or the host device 635.

The communications link 615 typically includes a delivery network 660 making a direct or indirect communication between the client system 605 and the host system 610, irrespective of physical separation. Examples of a delivery network 660 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 615 may include communication pathways 650, 655 that enable communications through the one or more delivery networks 660 described above. Each of the communication pathways 650, 655 may include, for example, a wired, wireless, cable or satellite communication pathway.

FIG. 6B illustrates a communication system 600 including a client system 605 communicating with a host system 610 through a communications link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6B are broadly described above with respect to FIG. 6A. In particular, the host system 610 and the communications link 615 of FIG. 6B typically have attributes comparable to those described with respect to the host system 610 and the communications link 615 of FIG. 6A, respectively. Likewise, the client system 605 of FIG. 6B typically has attributes comparable to, and may illustrate one possible embodiment of, the client system 605 of FIG. 6.

The client device 620 typically includes a general purpose computer 670 having an internal or external storage 672 for storing data and programs such as an operating system 674 (e.g., DOS, Windows®, Windows® 95, Windows®98, Windows®2000, Windows ® NT, Windows® Millennium Edition, Windows® XP, OS/2, UNIX and Linux) and one or more application programs. Examples of application programs include authoring applications 676 (e.g., word processing, database programs, spreadsheet programs, presentation programs, and graphics programs) capable of generating documents or other electronic content; client applications 678 (e.g., AOL client, CompuServe client, AIM client, AOL TV client, and ISP client) capable of communicating with other computer users, accessing various computer resources, and viewing, creating, or otherwise manipulating electronic content; and browser applications 680 (e.g., Netscape's Navigator and Microsoft's Internet Explorer) capable of rendering standard Internet content.

The general-purpose computer 670 also includes a central processing unit 682 (CPU) for executing instructions in response to commands from the client controller 625. In one implementation, the client controller 625 includes one or more of the application programs installed on the internal or external storage 672 of the general-purpose computer 670. In another implementation, the client controller 625 includes application programs externally stored in and executed by one or more device(s) external to the general-purpose computer 670.

The general-purpose computer typically will include a communication device 684 for sending and receiving data. One example of the communication device 684 is a modem. Other examples include a transceiver, a set-top box, a communication card, a satellite dish, an antenna, or another network adapter capable of transmitting and receiving data over the communications link 615 through a wired or wireless data pathway 650. The general-purpose computer 670 also may include a TV ("television") tuner 686 for receiving television programming in the form of broadcast, satellite, and/or cable TV signals. As a result, the client device 620 can selectively and/or simultaneously display network content received by communications device 684 and television programming content received by the TV tuner 686.

The general-purpose computer 670 typically will include an input/output interface 688 to enable a wired or wireless connection to various peripheral devices 690. Examples of peripheral devices 690 include, but are not limited to, a mouse 691, a mobile phone 692, a personal digital assistant 693 (PDA), a keyboard 694, a display monitor 695 with or without a touch screen input, and/or a TV remote control 696 for receiving information from and rendering information to subscribers. Other examples may include voice recognition and synthesis devices.

Although FIG. 6B illustrates devices such as a mobile telephone 692, a PDA 693, and a TV remote control 696 as being peripheral with respect to the general-purpose computer 670, in another implementation, such devices may themselves include the functionality of the general-purpose computer 670 and operate as the client device 620. For example, the mobile phone 692 or the PDA 693 may include computing and networking capabilities, and may function as a client device 620 by accessing he delivery network 660 and communicating with the host system 610. Furthermore, the client system 605 may include one, some, all, or none of the components and devices described above.

As described above, interface tags can be used to group network device interfaces and hence as a means for enabling monitoring of aggregated statistics for a group of network devices having one or more shared attributes. As such, interface tags may be used as a substitute for, or in combination with, one or more network device or network device interface attributes, examples of attributes for a network device including speed, communication interface type (e.g., POS, serial ethernet, fast ethernet, ATM), device manufacturer type, router type, interface name, description, packet size, Interface IP, Network name, Network Mask, and/or location.

A number of implementations have been described. Nevertheless, it will be understood that various modifications may be made. Accordingly, other implementations are within the scope of the following claims.

What is claimed is:

1. A method for generating metrics for network devices, comprising:
    enabling an association of tags with interfaces representing network devices;
    identifying a particular tag that corresponds to and enables monitoring of a particular group of network devices of interest;
    identifying a particular time period over which to aggregate metrics for the particular group of network devices;
    identifying interfaces that were associated with the particular tag during the particular time period;
    aggregating metrics for the particular group of network devices over the particular time period by:
        accessing timing data indicating when at least one of the identified interfaces became associated with the particular tag and when at least one of the identified interfaces became disassociated with the particular tag,
        based on the timing data, determining, for each of the identified interfaces, a portion of the particular time period over which the identified interface was associated with the particular tag, at least one of the identified interfaces being associated with the particular tag for less than all of the particular time period, and
        aggregating metrics associated with each of the identified interfaces for the determined portion of the particular time period; and
    generating an output based on the aggregated metrics for the particular group of network devices.

2. The method of claim 1 wherein the output for the particular group of network devices reflects activities of an individual network device during only the portion of the particular time period for which the individual network device was associated with the particular tag.

3. The method of claim 1 wherein the timing data includes historical information regarding interface tag changes.

4. The method of claim 1 wherein the timing data is stored relative to groups defined based on the interface tags.

5. The method of claim 1 wherein accessing the timing data comprises periodically determining which tag is associated with a particular interface and storing, for the particular interface, timing data that logs tags and corresponding times at which the particular interface was associated with the tags.

6. The method of claim 1 wherein accessing the timing data comprises detecting a change in network device interface status from a first tag to a second tag that is different than the first tag and, in response to detecting the change in network device interface status, storing timing data that logs a time associated with the change in network device interface status from the first tag to the second tag.

7. The method of claim 1 wherein the timing data is stored at interfaces of network devices.

8. The method of claim 1 wherein the timing data is stored at a server.

9. The method of claim 1 wherein aggregating metrics associated with each of the identified interfaces for the determined portion of the particular time period comprises aggregating metrics associated with each of the identified interfaces for only the determined portion of the particular time period without regard for metrics associated with each of the identified interfaces during a time period other than the determined portion of the particular time period.

10. The method of claim 1 wherein aggregating metrics associated with each of the identified interfaces for the determined portion of the particular time period comprises omitting metrics during the particular time period when the determined portion of the particular time period is less than all of the particular time period.

11. The method of claim 1 wherein aggregating metrics associated with each of the identified interfaces for the determined portion of the particular time period comprises aggregating network traffic metrics associated with each of the identified interfaces for the determined portion of the particular time period.

12. The method of claim 1 wherein;
at least one of the identified interfaces is associated with multiple tags concurrently, and
aggregating metrics associated with each of the identified interfaces for the determined portion of the particular time period comprises:
for the at least one identified interface that is associated with multiple tags concurrently, identifying a multiplier indicating a portion of the metrics for the at least one identified interface corresponding to the particular group of network devices;
determining an apportioned amount of the metrics for the at least one identified interface based on the multiplier, the apportioned amount of the metrics being less than all of the metrics; and
aggregating the apportioned amount of the metrics for the at least one identified interface.

13. A computer storage device readable by a computer system for generating metrics for network devices, the computer storage device storing executable instructions to cause the computer system to perform the following steps:
enabling an association of tags with interfaces representing network devices;
identifying a particular tag that corresponds to and enables monitoring of a particular group of network devices of interest;
identifying a particular time period over which to aggregate metrics for the particular group of network devices;
identifying interfaces that were associated with the particular tag during the particular time period;
aggregating metrics for the particular group of network devices over the particular time period by:
accessing timing data indicating when at least one of the identified interfaces became associated with the particular tag and when at least one of the identified interfaces became disassociated with the particular tag,
based on the timing data, determining, for each of the identified interfaces, a portion of the particular time period over which the identified interface was associated with the particular tag, at least one of the identified interfaces being associated with the particular tag for less than all of the particular time period, and
aggregating metrics associated with each of the identified interfaces for the determined portion of the particular time period; and
generating an output based on the aggregated metrics for the particular group of network devices.

14. The computer system of claim 13 wherein the output for the particular group of network devices reflects activities of an individual network device during only the portion of the particular time period for which the individual network device was associated with the particular tag.

15. The computer system of claim 13 wherein the timing data includes historical information regarding interface tag changes.

16. The computer system of claim 13 wherein the timing data is stored relative to groups defined based on the interface tags.

17. The computer system of claim 13 wherein accessing the timing data comprises periodically determining which tag is associated with a particular interface and storing, for the particular interface, timing data that logs tags and corresponding times at which the particular interface was associated with the tags.

18. The computer system of claim 13 wherein accessing the timing data comprises detecting a change in network device interface status from a first tag to a second tag that is different than the first tag and, in response to detecting the change in network device interface status, storing timing data that logs a time associated with the change in network device interface status from the first tag to the second tag.

19. The computer system of claim 13 wherein the timing data is stored at interfaces of network devices.

20. The computer system of claim 13 wherein the timing data is stored at a server.

21. A system including at least one processor configured to perform operations comprising:
enabling an association of tags with interfaces representing network devices;
identifying a particular tag that corresponds to and enables monitoring of a particular group of network devices of interest;
identifying a particular time period over which to aggregate metrics for the particular group of network devices;
identifying interfaces that were associated with the particular tag during the particular time period;
aggregating metrics for the particular group of network devices over the particular time period by:
accessing timing data indicating when at least one of the identified interfaces became associated with the particular tag and when at least one of the identified interfaces became disassociated with the particular tag,
based on the timing data, determining, for each of the identified interfaces, a portion of the particular time period over which the identified interface was associated with the particular tag, at least one of the identified interfaces being associated with the particular tag for less than all of the particular time period, and
aggregating metrics associated with each of the identified interfaces for the determined portion of the particular time period; and
generating an output based on the aggregated metrics for the particular group of network devices.

* * * * *